3,011,915
METHOD OF COATING CLOTH WITH A NYLON SOLUTION
Lawrence A. Sklar, Bronx, N.Y., assignor to Capskar, Inc., Bronx, N.Y., a corporation of New York
No Drawing. Filed Mar. 17, 1958, Ser. No. 722,096
1 Claim. (Cl. 117—120)

This invention relates to new products and articles of manufacture, more particularly to cloth treated with a nylon solution.

There is a need at the present time in the cloth weaving industry for a coating on cloth, which will make the cloth as workable for article manufacture as paper, and not affect its breathing and absorptive qualities. Paper products such as paper napkins, towels, table cloths, etc., have replaced the cloth products to such a great extent, that the resulting loss of business has run into hundreds of millions of dollars. This loss of business to the cloth industry has not wholly been due to the difference of price in the two commodities. Paper in many instances is priced as high as cloth. It's the labor saving workability of paper which makes the end product lower in price to the consumer. Paper products can be cut anywhere, there is no ragged roiling ravelling edge. The product lies flat, it folds and packs easily into dispensers. There are many cloths of economic construction that could easily compete with paper products, providing the same methods of cutting and packing could be applied to them. But, when cloth is cut evenly with pinking shears, the edge ravels and curls. The edges have to be bound and sewn. This additional labor prices these cloths out of the market in their competition with paper.

This invention has as an object the preparation of new coated cloths which breathe and are absorptive to liquids and when cut the edge will resist ravelling and curling. The coated cloth can be laundered or dry cleaned, is dimensionally stable over a wide range of temperatures, and can be cut into napkins, towels, table cloths etc., no sewing being required to bind the edge. The nylon used in the solution for coating cloth is as described in U.S. Patents 2,071,250, 2,071,253, and 2,130,948. These polymers, which may be referred to as superpolymers, are crystalline rather than resinous and are linear or long chain products of high molecular weight. They are obtainable from bifunctional reactants, as for instance, from the reaction of diamines and dicarboxylic acids; the self-polymerization of monoaminomonocarboxylic acids or their amide-forming derivatives, e.g. the lactams; and from other reactants, referred to hereinafter which yield like high molecular weight, linear, fiber-forming, crystalline polymers. Among the most useful polymers for purposes of this invention are the polyamides which are defined to include in addition to the polyamides obtained solely from polyamide-forming reactants, the linear polymers containing recurring amide groups as an integral part of the main chain of atoms in the molecule, as for example the ester-amide interpolymers obtained by including other bifunctional reactants with the polyamide-forming reactants. The microcrystalling nature of the fiber-forming linear polymers is evidenced by their critical melting points and by the type of diffraction pattern which they furnish on X-ray examination. The term "fiber-forming" refers to the property of these polymers of yielding filaments, as by extrusion of the molten polymer, which upon cold drawing are formed into fibers which show by characteristic X-ray diffraction pattern orientation along the axis of the fiber. Upon hydrolysis with mineral acids the polyamides yield monomeric amide-forming reactants. For example, a polyamide derived from a diamine and a dibasic carboxylic acid yields, on hydrolysis with hydrochloric acid, the dibasic carboxylic acid and the diamine hydrochloride. Polyamides having an intrinsic viscosity of at least 0.4 and preferably between 0.5 and 2.0 are most useful. Intrinsic viscosity is defined in U.S. Patent 2,130,948. These polymers are generally sold under the generic term "nylon."

The preparation of the nylon solution involves the use of hydrochloric acids, formaldehyde and selected metallic salts, preferably zinc salts, and neutralizing baths employed when the cloth has been coated.

A preferred method for coating cloth consists of making a nylon solution, by dissolving 60 parts by weight of finely divided polymer or nylon obtained from mills or salvage companies as a waste and ground to pass a 14 mesh screen, in 120 parts of hydrochloric acid 38% and adding 15 parts paraformaldehyde in powder form, after the paraformaldehyde has been thoroughly mixed in, 7 parts of zinc stearate in powder form is then added and also mixed into the solution until a doughlike paste is formed. Thirty parts zinc chloride in granular powder form is then added and the mixture agitated until a smooth viscous paste has been arrived at. This is all done at room temperature 50 to 85 degrees F. Ten parts of methanol was then added to thin the paste for the following method of application to cloth:

A cotton cloth was knife coated with the nylon solution and then sent into a tank of cold water 40 to 45 degrees F. The nylon solution deposited on the cloth set up as a gum on the cloth when it hit the cold water. The cloth was then passed through two squeeze rollers to force the gum into the cotton fibers. The cloth was then sent in a tank containing an aqueous ammonia solution until a pH of 8 was reached on the cloth, from there to a tank containing an aqueous formic acid solution until pH of 5 was reached, and then into a tank of running water where salts formed from the above neutralizing process were washed free from the cloth and the cloth was then dried. A good bond was formed with the cotton and nylon. The result was a cloth with a breathing absorptive coat of nylon. The cloth when cut at any point had an edge which resisted ravelling and curling. The coated cloth could be laundered, or dry cleaned without affecting the bond of nylon and cotton.

A flow sheet of the process is as follows:

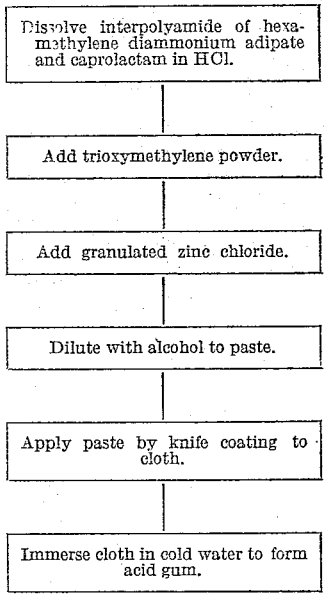

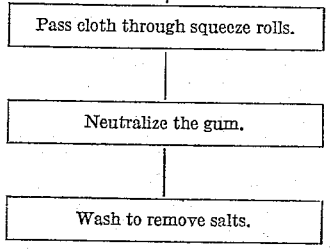

The following examples in which quantities are stated in parts by weight are illustrative of the methods which may be used for carrying out the invention.

*Example 1*

400 parts of an interpolyamide prepared from hexamethylene diammonium adipate and caprolactam in a ratio of 60:40 which had been ground to pass a 14 mesh screen was dissolved in 600 parts hydrochloric acid 38%. 100 parts trioxymethylene in powder form was then added and stirred in. 50 parts lead stearate in powder form was then stirred in, and 200 parts of zinc chloride granular powder form was then added and the mass thoroughly agitated until a smooth paste was formed. 100 parts of methanol added to dilute the solution for the coating of a rayon cloth. The process of coating the same as used in the preferred method.

*Example 2*

8 parts of filaments of polyhexamethylene sebacamide as waste material and virgin in equal proportions was dissolved in 24 parts of formic acid 98%. 2 parts of paraformaldehyde in powder form was stirred in. 1 part of zinc stearate was added and 4 parts of zinc chloride also added and the mass agitated until a smooth paste was arrived at. The mixture was then diluted with methanol 4 parts. Cotton cloth is then passed through the solution, excess squeezed off with pad rollers and sent into a tank of cold water. The coating formed into gum on the cloth. The cloth was then sent into a tank containing an aqueous solution of sodium bicarbonate. The bubbling action of the release of carbon dioxide, from acid gum and sodium bicarbonate reaction, formed a light spongy coat on the cloth. The cloth was then soured and washed in running water to free it of any salts and then dried.

Extraction of the acids from the coated cloths can be performed by simple slow leaching in water until a pH of 5.5 is reached, or extraction with strong bases such as sodium hydroxide triethanol amine, etc., and then subsequent souring with acid and washing in water to remove salts.

The nylon solution used to coat cloth contemplated by this disclosure may contain various modifying agents, as for example pigments, fillers etc. which may be added to the solution when increased flexibility is desired. The nylon coated cloth may be plasticized with plasticizers such as hydroxy-diphenyl diphenylpropane, various sulfonamides, glycols etc. Resins, antioxidants, bactericides, water repellents, surface modifying agents etc. may also be employed.

In general crystalline synthetic linear superpolymers are relatively chemically inert and hence numerous materials may be used either by mixing into the nylon acid solution or after the cloth has been treated with the nylon solution and dried; as suitable examples stearates, metallic stearates, powdered metals, various resins and polymeric materials such as polystyrene, polymethacrylic acid, interpolymers of maleic anhydride, etc., as well as waxes such as hydrogenated castor oil Asiatic wax, etc., may be employed.

The cloths employed may be any fibre such as cotton, rayon, jute, silk, wool, etc.; or combinations of the above fibers, or the synthetic fibers such as Orlon, Dacron, fiber glass etc., or combinations of the above fibers.

The coating may be performed by the pad rolling method, or by passing the cloth through a dilute solution and squeezing off excess. The preferred method is by knife coating and squeezing the coating into the cloth with squeeze rollers.

The products of this invention are characterized by a coating on cloth that breathes, and is highly absorptive to liquids. The coating deposited on the cloth is extremely light with great covering power, as little as one ounce of nylon can cover a square yd. of cloth and give the cloth such qualities as abrasion resistance, many times greater than the uncoated cloth, an edge that resists rolling and ravelling when cut, and when used on natural fibers the cloth dries quicker after laundering than the uncoated cloth. The cloth when coated with the nylon solution can be calendered, embossed, printed or dyed to any shade using standard equipment for these procedures. An important advantage of this invention lies in the factor that a small amount of the polymer approximately 1 oz. to the sq. yd. of cloth permits that cloth to move into a wide range of uses it previously could not be used for, because of the high cost of handling it previously had.

I claim:

The method of applying a nylon coating upon cloth comprising the steps of: dissolving approximately by weight 400 parts of an interpolyamide prepared from hexamethylene diammonium adipate and caprolactam in a ratio of 60 to 40 in 600 parts hydrochloric acid 38 percent, adding and stirring 100 parts trioxymethylene in powder form, and subsequently adding 200 parts granulated zinc chloride and agitating the mass until a smooth paste is formed; adding an alcohol to dilute the paste to desired viscosity, applying the paste to the cloth and subsequently immersing the cloth into cold water whereby the coating sets up as an acid gum; passing the cloth through squeeze rollers to force the gum into the fibers of the cloth; neutralizing the gum, and washing the cloth to remove salts formed during neutralization.

References Cited in the file of this patent

UNITED STATES PATENTS

| | | |
|---|---|---|
| 2,359,878 | Schupp | Oct. 10, 1944 |
| 2,610,927 | Foulds | Sept. 16, 1952 |
| 2,689,193 | Lipson et al. | Sept. 14, 1954 |
| 2,696,448 | Hammer et al. | Dec. 7, 1954 |

FOREIGN PATENTS

| | | |
|---|---|---|
| 161,602 | Australia | May 28, 1953 |
| 626,581 | Great Britain | July 18, 1949 |